US012566432B2

(12) United States Patent
Ojima et al.

(10) Patent No.: US 12,566,432 B2
(45) Date of Patent: Mar. 3, 2026

(54) ABNORMALITY DIAGNOSIS SYSTEM AND ABNORMALITY DIAGNOSIS METHOD

(71) Applicant: Hitachi Industrial Equipment Systems Co., Ltd., Tokyo (JP)

(72) Inventors: Masayoshi Ojima, Tokyo (JP); Masahiro Yamazaki, Tokyo (JP); Kenji Sato, Tokyo (JP); Yutaka Kobayashi, Tokyo (JP); Hideyuki Gotou, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 372 days.

(21) Appl. No.: 18/039,314

(22) PCT Filed: Aug. 24, 2021

(86) PCT No.: PCT/JP2021/031055
§ 371 (c)(1),
(2) Date: May 30, 2023

(87) PCT Pub. No.: WO2022/118507
PCT Pub. Date: Jun. 9, 2022

(65) Prior Publication Data
US 2024/0004380 A1      Jan. 4, 2024

(30) Foreign Application Priority Data
Dec. 4, 2020      (JP) ................................. 2020-202029

(51) Int. Cl.
*G05B 23/02*          (2006.01)

(52) U.S. Cl.
CPC ..... *G05B 23/0289* (2013.01); *G05B 23/0272* (2013.01)

(58) Field of Classification Search
CPC ............ G05B 23/0289; G05B 23/0272; G05B 23/0262
See application file for complete search history.

(56) References Cited

U.S. PATENT DOCUMENTS

2003/0005746 A1    1/2003  Iwazaki et al.
2019/0012553 A1*   1/2019  Maruchi ............... G06F 11/079

FOREIGN PATENT DOCUMENTS

JP        07-207570 A       8/1995
JP        2003-14683 A      1/2003
JP        2012-009064 A     1/2012
JP        2018-80710 A      5/2018
JP        2019-16209 A      1/2019

(Continued)

OTHER PUBLICATIONS

English Translation of "WO-2020138025-A1" (Year: 2020).*

(Continued)

*Primary Examiner* — Charles R Kasenge
(74) *Attorney, Agent, or Firm* — MATTINGLY & MALUR, PC

(57)          ABSTRACT

A data analysis unit includes a validity determination unit that calculates a determination factor for determining the validity of a data analysis process to determine the validity of the data analysis process, and displays the validity determination result on a display device.

8 Claims, 9 Drawing Sheets

(56) References Cited

FOREIGN PATENT DOCUMENTS

| | | | |
|---|---|---|---|
| JP | 2020-41849 A | 3/2020 | |
| WO | WO-2020138025 A1 * | 7/2020 | ............. B23Q 17/09 |

OTHER PUBLICATIONS

Extended European Search Report received in corresponding European Application No. 21900263.1 dated Sep. 23, 2024.
International Search Report of PCT/JP2021/031055 dated Nov. 16, 2021.

* cited by examiner

F I G. 1
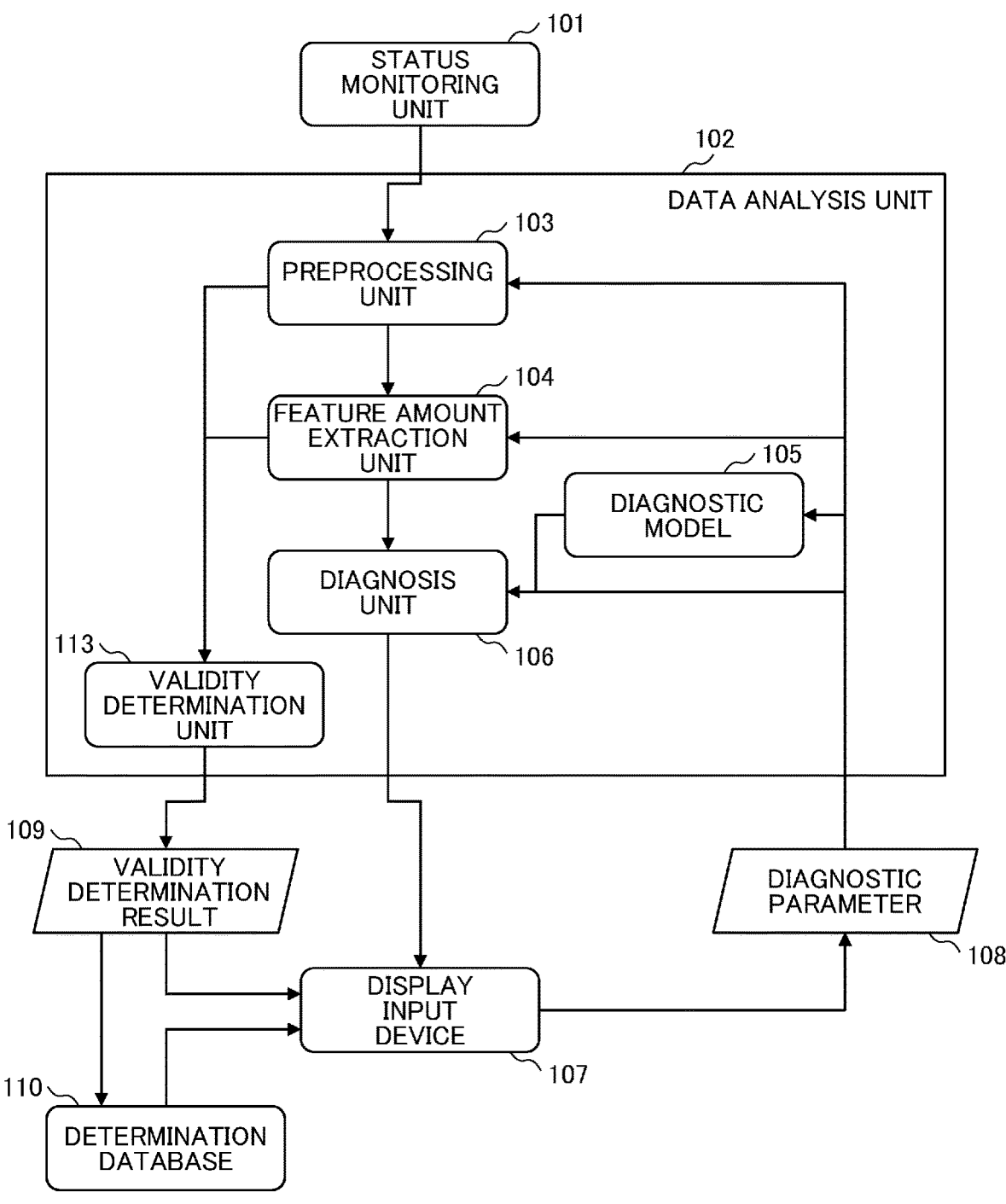

F I G. 2
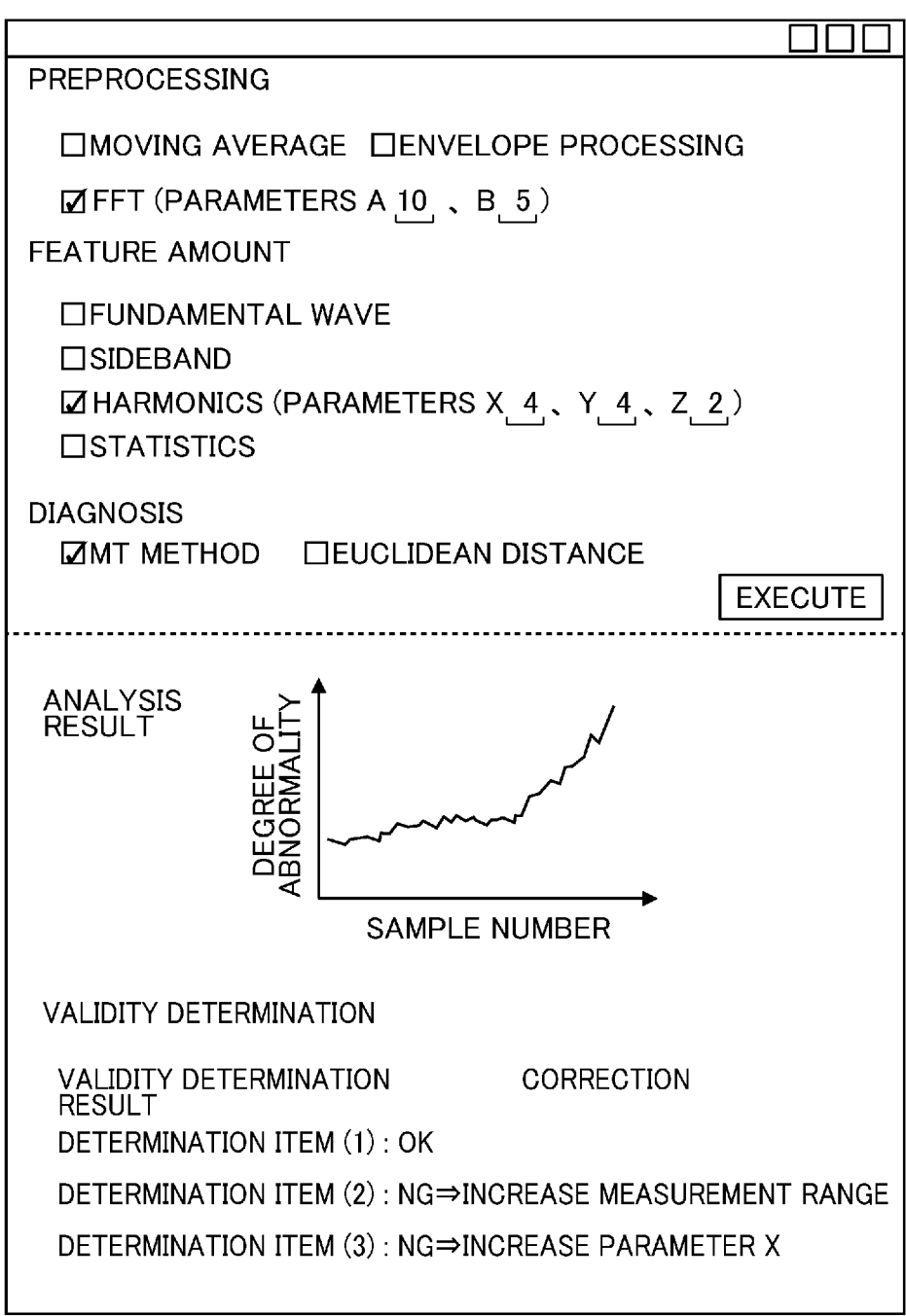

F I G. 3

| DETERMINATION ITEM (1) (MEASUREMENT RANGE) | VALIDITY DETERMINATION RESULT | VALID | INVALID |
|---|---|---|---|
| | GRAPHICAL DETERMINATION EXAMPLE | MEASUREMENT RANGE UPPER LIMIT — MAXIMUM VALUE / SIGNAL / LOWER LIMIT — MINIMUM VALUE | (graphical example) |
| | DETERMINATION FACTOR CALCULATION EXAMPLE | (MAXIMUM VALUE OF SIGNAL < UPPER LIMIT OF MEASUREMENT RANGE) AND (MINIMUM VALUE OF SIGNAL > LOWER LIMIT OF MEASUREMENT RANGE) | (MAXIMUM VALUE OF SIGNAL = UPPER LIMIT OF MEASUREMENT RANGE) OR (MINIMUM VALUE OF SIGNAL = LOWER LIMIT OF MEASUREMENT RANGE) |
| DETERMINATION ITEM (2) (PEAK VALUE) | VALIDITY DETERMINATION RESULT | VALID | INVALID |
| | GRAPHICAL DETERMINATION EXAMPLE | PEAK VALUE / SIGNAL / DETECTION WIDTH | DETECTION WIDTH |
| | DETERMINATION FACTOR CALCULATION EXAMPLE | PEAK VALUE/AVERAGE VALUE OF SURROUNDING SIGNALS > DETERMINATION THRESHOLD VALUE | PEAK VALUE/AVERAGE VALUE OF SURROUNDING SIGNALS ≤ DETERMINATION THRESHOLD VALUE |
| DETERMINATION ITEM (3) (PEAK POSITION) | VALIDITY DETERMINATION RESULT | VALID | INVALID |
| | GRAPHICAL DETERMINATION EXAMPLE | PEAK VALUE / SIGNAL / DETECTION WIDTH | DETECTION WIDTH |
| | DETERMINATION FACTOR CALCULATION EXAMPLE | UPPER LIMIT OF DETECTION > PEAK POSITION > LOWER LIMIT OF DETECTION | PEAK POSITION = UPPER AND LOWER LIMITS OF DETECTION |

F I G. 4
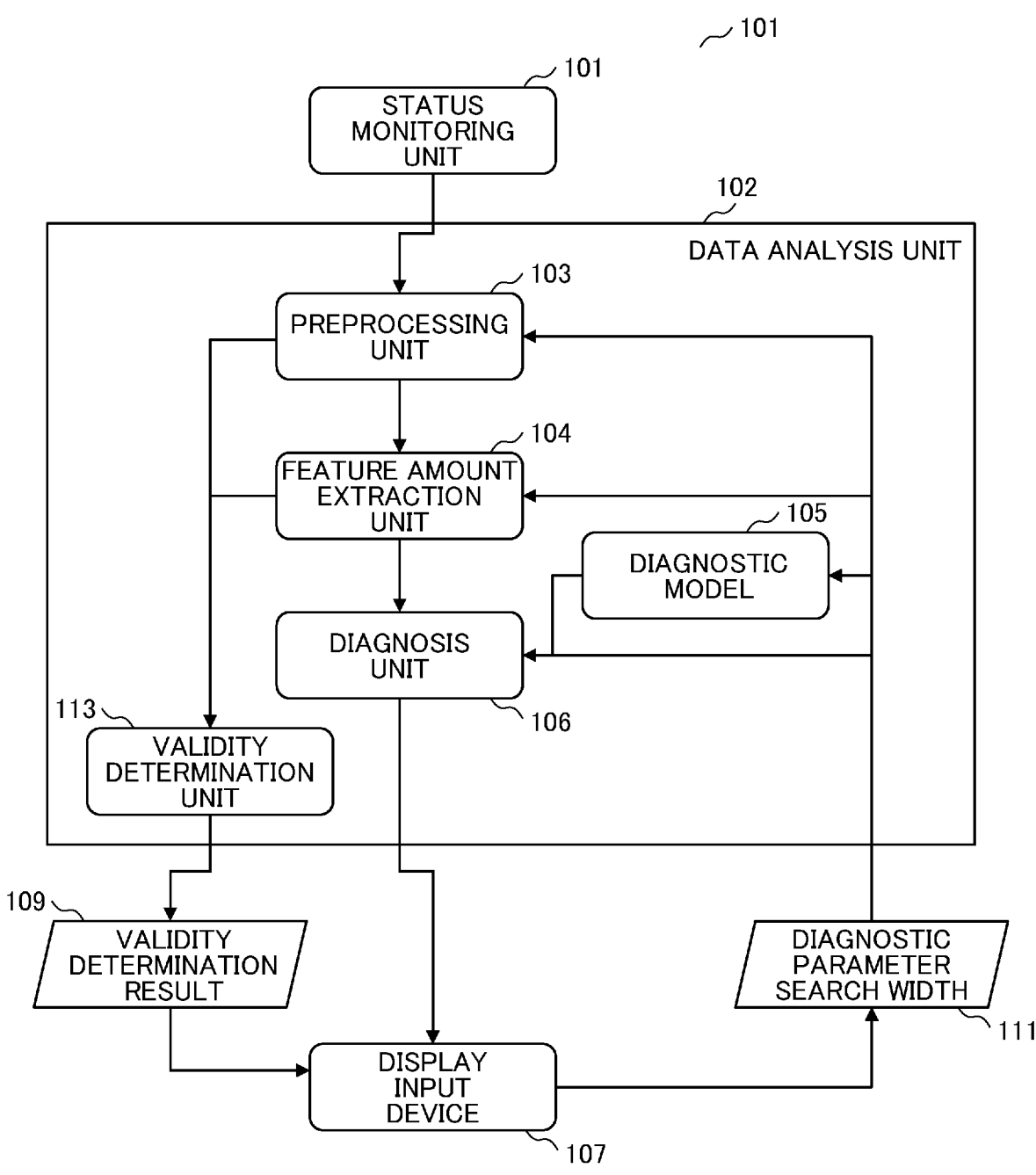

F I G. 5

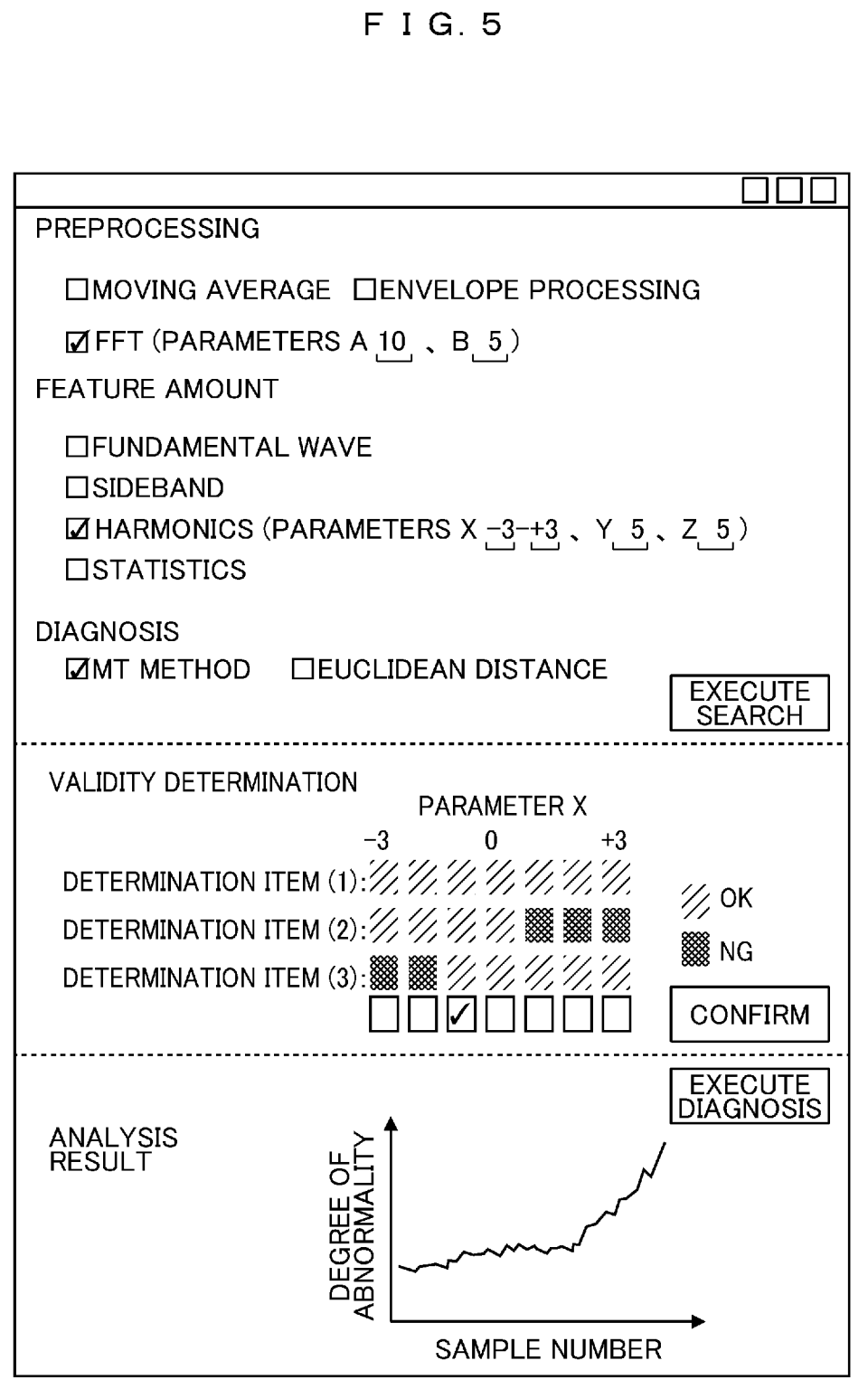

PREPROCESSING

☐MOVING AVERAGE   ☐ENVELOPE PROCESSING

☑FFT (PARAMETERS A 10 、 B 5 )

FEATURE AMOUNT

☐FUNDAMENTAL WAVE
☐SIDEBAND
☑HARMONICS (PARAMETERS X −3−+3 、 Y 5 、 Z 5 )
☐STATISTICS

DIAGNOSIS
☑MT METHOD   ☐EUCLIDEAN DISTANCE

EXECUTE
SEARCH

VALIDITY DETERMINATION

PARAMETER X

−3        0        +3

DETERMINATION ITEM (1):        ▨ OK

DETERMINATION ITEM (2):        ▨ NG

DETERMINATION ITEM (3):

☐ ☐ ☑ ☐ ☐ ☐ ☐        CONFIRM

EXECUTE
DIAGNOSIS

ANALYSIS
RESULT

DEGREE OF ABNORMALITY

SAMPLE NUMBER

F I G. 6
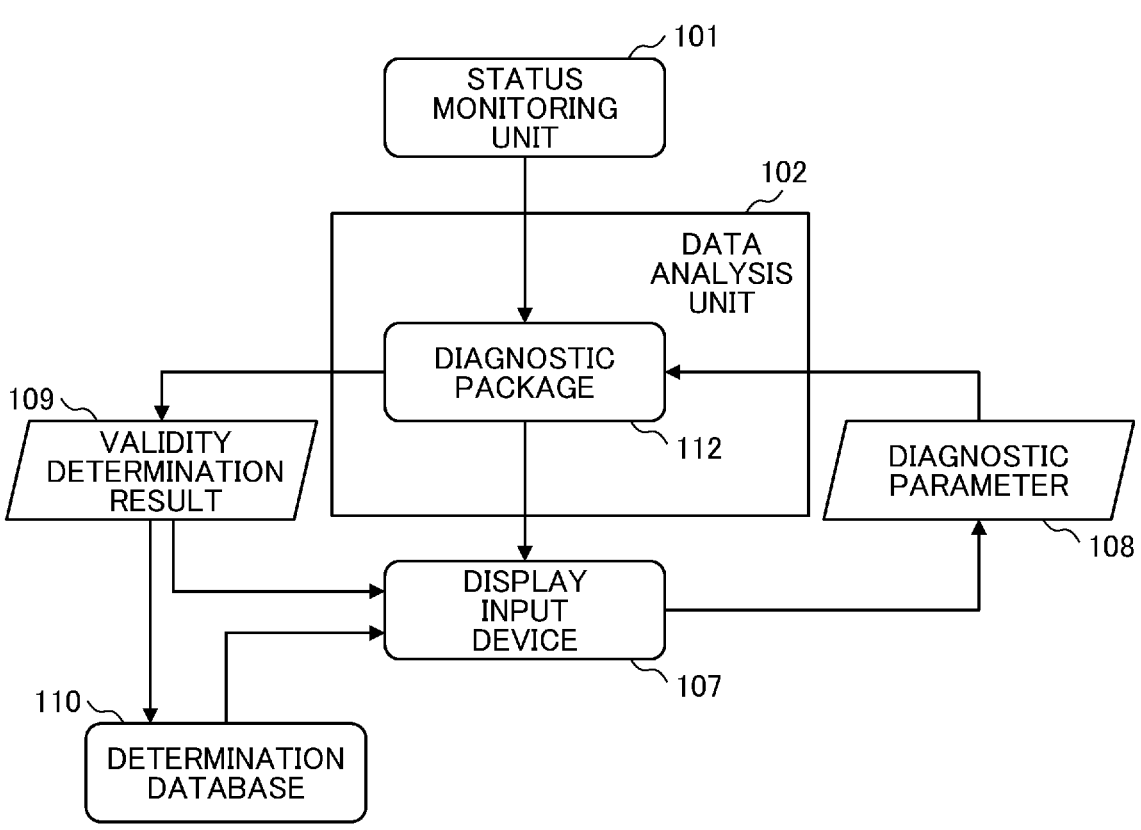

F I G. 7
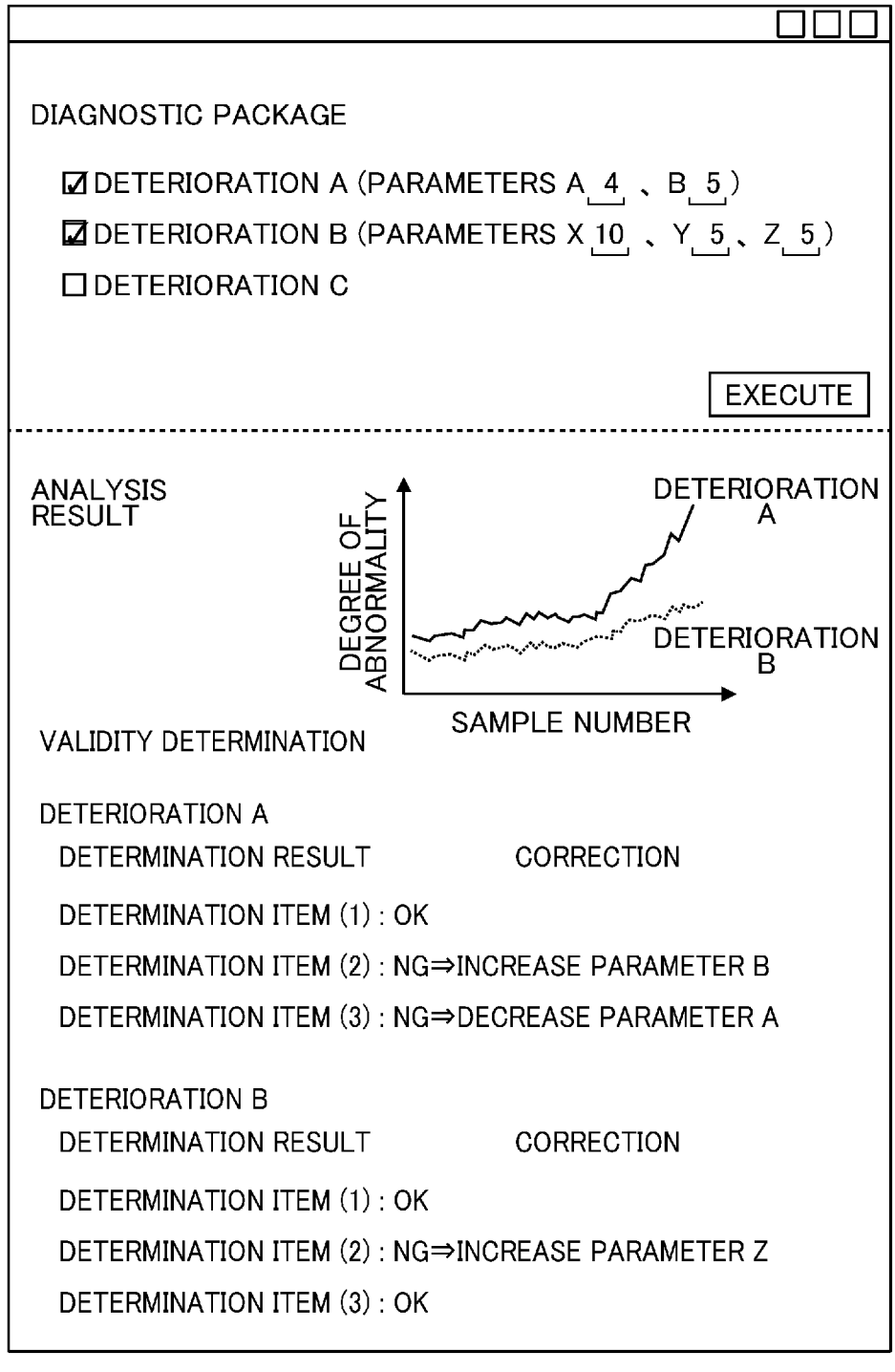

F I G. 8
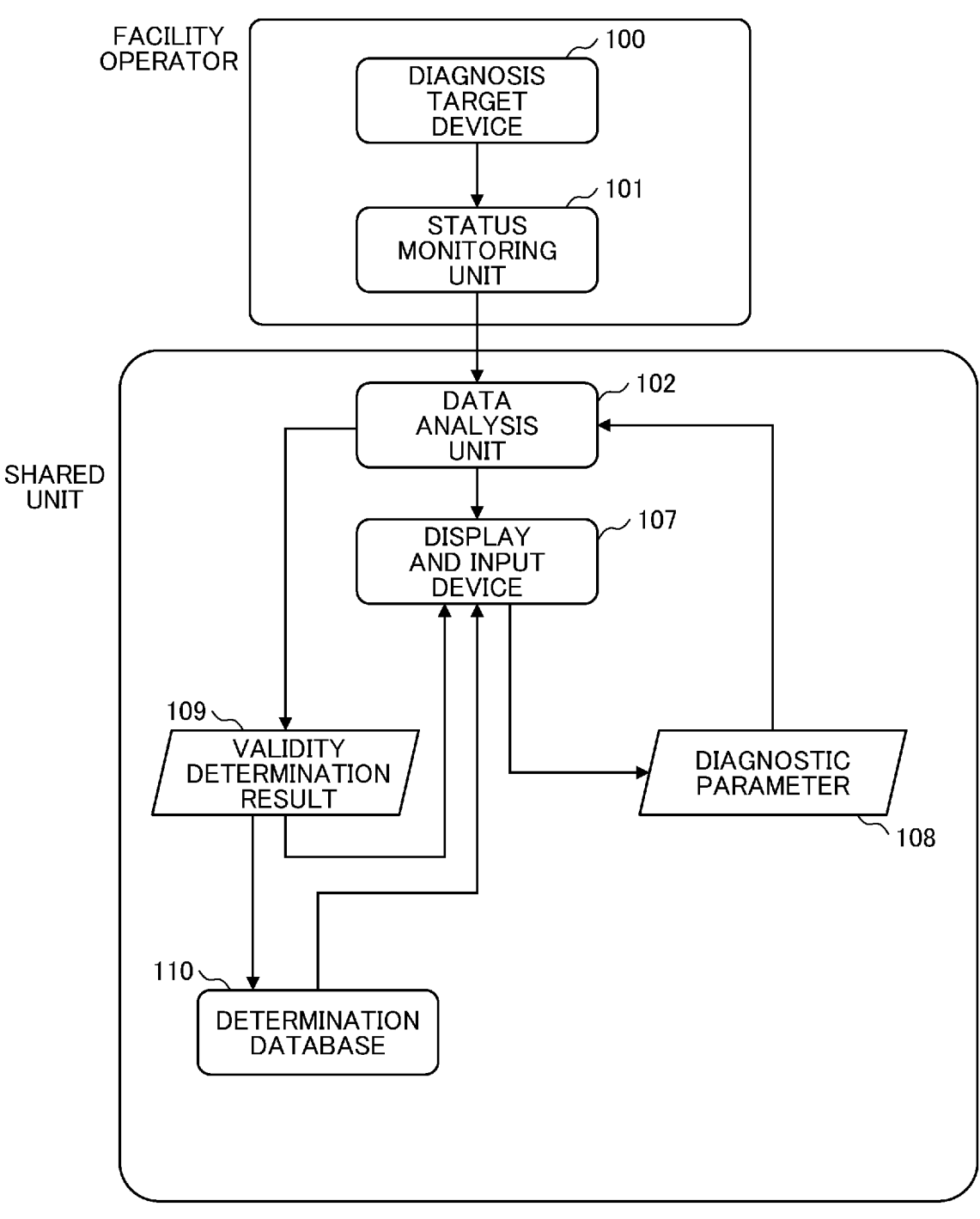

F I G. 9
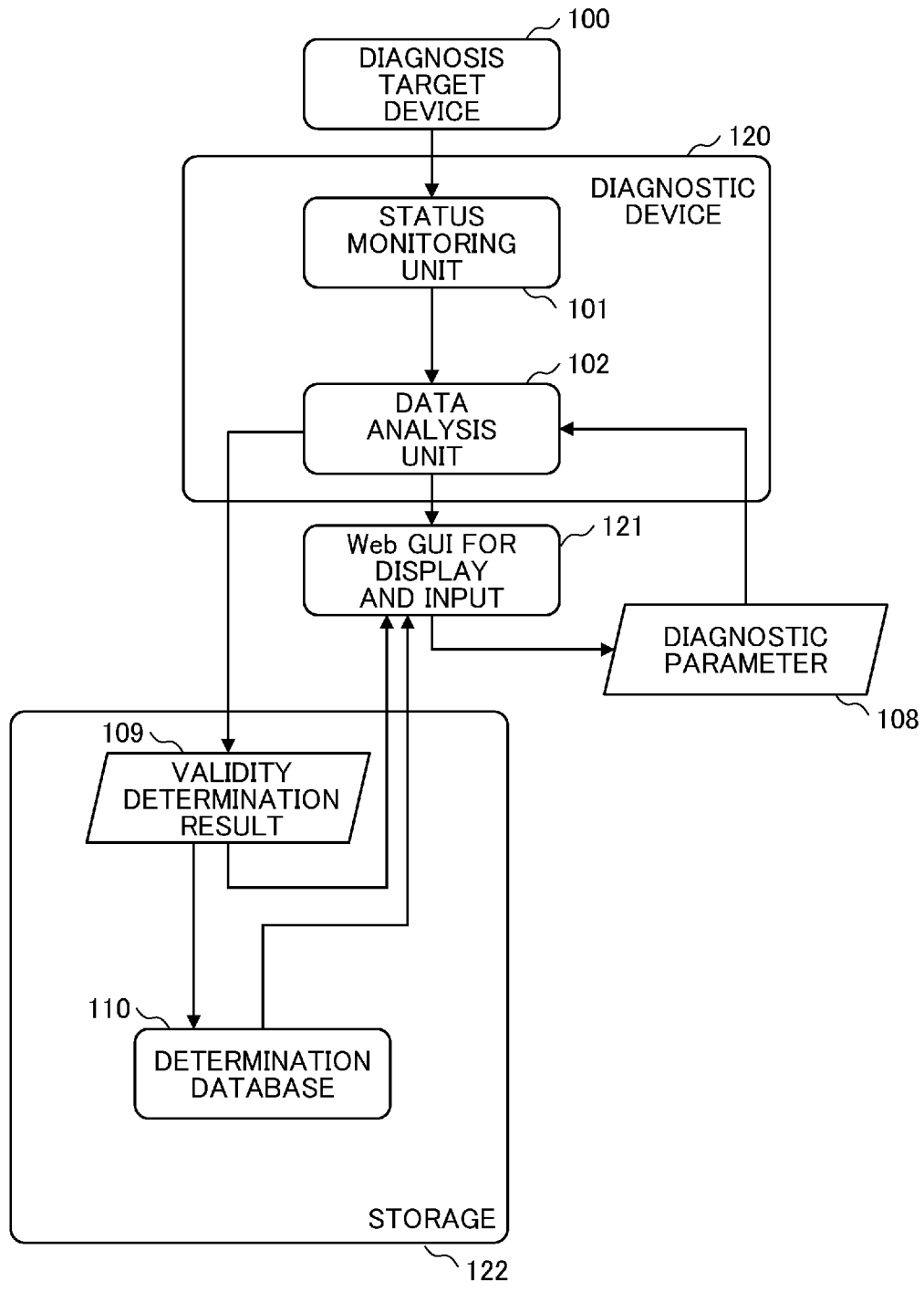

ABNORMALITY DIAGNOSIS SYSTEM AND ABNORMALITY DIAGNOSIS METHOD

TECHNICAL FIELD

The present invention relates to an abnormality diagnosis system and an abnormality diagnosis method.

BACKGROUND ART

Appropriate maintenance is important in order to continue production in the equipment management of the production line in a manufacturing factory. Therefore, in order to avoid the need to stop the operation of equipment due to a sudden failure, techniques have been developed to detect equipment abnormalities and prevent failures.

In recent years, in such abnormality detection techniques, a technique for detecting an abnormality by data analysis, such as machine learning, using equipment status monitoring information has been developed. In such an abnormality detection technique, in order to detect failures in advance with sufficient accuracy, it is necessary to sufficiently verify the validity of the data analysis process.

As a method for verifying the validity of the data analysis process in such abnormality detection, there is a system that graphically displays histograms or the like of status monitoring data and assists the analyst in determining the validity, as in Patent Document 1.

CITATION LIST

Patent Document

Patent Document 1: JP 2019-16209 A

SUMMARY OF THE INVENTION

Problems to be Solved by the Invention

When verifying the validity of the data analysis process for abnormality diagnosis from histograms or the like of status monitoring data, it is necessary to determine what kind of display is appropriate. For this reason, expertise in data analysis and expertise in equipment operation are essential.

However, although the engineers in the field of operation have specialized knowledge of the equipment itself and failure phenomena, there are very few of them who also have expertise in data analysis.

It is an object of the present invention to provide an abnormality diagnosis system and an abnormality diagnosis method that enable even a person who does not have expertise in data analysis to easily determine the validity of the data analysis process.

Solutions to Problems

An abnormality diagnosis system according to an aspect of the present invention is an abnormality diagnosis system for diagnosing an abnormality in industrial equipment, and includes: a data analysis unit that analyzes data based on status monitoring information of the industrial equipment; and a display device that displays an analysis result of the data. The data analysis unit includes a validity determination unit that calculates a determination factor for determining validity of an analysis process of the data to determine the validity of the data analysis process. The display device displays a determination result of the validity.

An abnormality diagnosis method according to an aspect of the present invention is an abnormality diagnosis method for diagnosing an abnormality in industrial equipment, and includes: analyzing data based on status monitoring information of the industrial equipment; calculating a determination factor for determining validity of an analysis process of the data to determine the validity of the data analysis process; and displaying an analysis result of the data and a determination result of the validity.

Effects of the Invention

According to an aspect of the present invention, even a person who does not have expertise in data analysis can easily determine the validity of the data analysis process.

BRIEF DESCRIPTION OF THE DRAWINGS

FIG. 1 is a diagram showing the configuration of an abnormality diagnosis system of a first embodiment.

FIG. 2 is a diagram showing an example of a user interface in the first embodiment.

FIG. 3 is a diagram showing examples of a determination factor in the first embodiment.

FIG. 4 is a diagram showing the configuration of an abnormality diagnosis system of a second embodiment.

FIG. 5 is a diagram showing an example of a user interface in the second embodiment.

FIG. 6 is a diagram showing the configuration of an abnormality diagnosis system of a third embodiment.

FIG. 7 is a diagram showing an example of a user interface in the third embodiment.

FIG. 8 is a diagram showing the configuration of an abnormality diagnosis system of a fourth embodiment FIG. 9 is a diagram showing the configuration of an abnormality diagnosis system of a fifth embodiment.

MODE FOR CARRYING OUT THE INVENTION

Next, embodiments will be described with reference to the diagrams.

First Embodiment

The configuration of an abnormality diagnosis system of a first embodiment will be described with reference to FIG. 1.

The status of industrial equipment is monitored by a status monitoring unit 101, a data analysis unit 102 detects an abnormality or deterioration tendency of the equipment using the information, and the analysis result is displayed on a display input device 107.

The data analysis unit 102 includes: a preprocessing unit 103 that processes data transmitted from the status monitoring unit 101 into data necessary for analysis; a feature amount extraction unit 104 that extracts information, which is a feature of analysis, from the preprocessed data; a diagnostic unit 106 that estimates an abnormality or deterioration tendency of the equipment by using the extracted feature amount; and a validity determination unit 113 that determines the validity of data analysis.

The validity determination unit 113 calculates a determination factor for determining the validity of the data analysis from the input/output information of the preprocessing unit 103 or the feature amount extraction unit 104, determines the validity of the data analysis based on the calculated determination factor, and displays a validity determination result 109 on the display input device 107.

In order to perform a diagnosis, a diagnostic parameter 108 is input from the display input device 107, and a diagnostic model 105 is designated as the diagnostic parameter 108 when performing a plurality of diagnoses. In addition, a method for correcting the diagnostic parameter 108 corresponding to the validity determination result 109 is stored in a determination database 110, and an appropriate method for correcting the diagnostic parameter 108 according to the validity determination result 109 is transmitted to the display input device 107.

FIG. 2 shows an example of a user interface displayed on the display input device 107.

The upper part shows the preprocessing unit 103, the feature amount extraction unit 104, the diagnostic model 105, and an interface for inputting the diagnostic parameter 108 to these in data analysis. In this example, FFT (Fast Fourier Transform) is selected as preprocessing, harmonics is selected as a feature amount, and an MT method (Mahalanobis-Taguchi method) is selected as diagnosis. In addition, initial values are given to two parameters A and B for FFT, and are given to three parameters X, Y, and Z for harmonics.

Based on the input information and the data from the status monitoring unit 101, the diagnostic unit 106 diagnoses the abnormality or deterioration tendency of the industrial equipment, and displays the analysis result on the lower user interface.

In addition to the analysis result, the validity determination result 109 and a diagnostic parameter correction method corresponding to the validity determination result 109 stored in the determination database 110 are displayed on the lower user interface.

In this example, three determination items (1), (2), and (3) are displayed. Among these, one determination item (1) indicates a state of OK (appropriate analysis is done), and the remaining two determination items (2) and (3) indicate a state of NG (appropriate analysis is not done).

In addition, a correction method is indicated for each NG determination item. Specifically, an instruction to increase the measurement range of status monitoring is displayed for the determination item (2). In addition, an instruction to increase a harmonic parameter X is displayed for the determination item (3).

In this manner, whether or not the data analysis is valid is displayed on the display input device 107 as the validity determination result 109. In addition, as the correction method, a method of correcting the diagnostic parameter 108 is displayed on the display input device 107. Therefore, even a person who does not have expertise in data analysis can appropriately adjust the diagnostic parameter 108.

Next, FIG. 3 shows an example of derivation of the validity determination result 109.

An example of graphically determining the validity of the data analysis process and an example of calculating determination factors are shown for each of two determination item examples. First, for the first determination item example, FIG. 3(1) shows an example of validity determination regarding the measurement range of the status monitoring unit 101 in association with the preprocessing of data analysis.

Status monitoring should be performed within the measurement range. If the measurement range is exceeded, an accurate status quantity cannot be measured, so that it is not possible to perform a correct abnormality diagnosis. Therefore, as a graphical validity determination, it can be determined whether or not the status monitoring signal is within the measurement range.

When this determination is calculated as a determination factor, if the maximum value of the status monitoring signal is smaller than the upper limit of the measurement range and the minimum signal value is larger than the lower limit of the measurement range, the determination factor is calculated as valid. On the other hand, if the maximum signal value matches the upper limit of the measurement range or the minimum signal value matches the lower limit of the measurement range, the determination factor is calculated as invalid.

In this manner, it is possible to determine the validity of the data analysis based on the automatically calculated determination factor without graphically checking the status monitoring signal.

Next, FIG. 3(2) shows an example of validity determination regarding peak detection in feature amount extraction.

When extracting a feature amount from the frequency spectrum or the like, a peak value may be extracted from a predetermined detection width as the feature amount. At this time, as a graphical validity determination, it is determined that there is validity if the detected peak value is sufficiently larger than the noise level of the surrounding spectrum, and it is determined that there is no validity if the detected peak value is equal to the noise level.

When this determination is calculated as a determination factor, it can be determined that there is validity if the value of (peak value/average value of surrounding signals) is larger than a determination threshold value, and it can be determined that there is no validity if the value of (peak value/average value of surrounding signals) is equal to or less than the threshold value. For example, assuming that the determination threshold value is 2, it is determined that there is validity if the peak value is equal to or more than twice the average value of the surrounding signals, and it is determined that there is no validity if the peak value is less than twice the average value of the surrounding signals. This determination threshold value may be set in advance or given as a part of the diagnostic parameter 108.

In this manner, validity determination for peak detection can also be made based on determination factors instead of graphical determination. A plurality of such determination factors may be calculated from the data analysis process, and a plurality of determination factors may be calculated from one data analysis process.

Then, as in FIG. 3(2), regarding peak detection in feature amount extraction, it may be necessary to determine the validity even for the position indicating the detected peak value. FIG. 3(2) shows an example of the validity determination regarding the peak position.

As an example of graphical determination, for a predetermined peak detection width, if the actually detected peak position is within the detection width, it can be determined that the data analysis is valid. When the detected peak position is at the end of the detection width, there may be a larger peak outside the detection width and accordingly, it can be determined that the data analysis is not valid. When this determination is calculated as a determination factor, the peak position is compared with the upper limit and the lower limit of the detection width. If the peak position is between the upper and lower limits, it can be determined that there is validity, and if the peak position is the same as the upper and lower limits, it can be determined that there is no validity.

Thus, a plurality of validity determination results 109 may be calculated from one data analysis process.

In addition, as a method for correcting the data analysis when it is determined that there is no validity in the examples of the validity determination result 109 of FIGS. 3(2) and 3(3), it is conceivable to increase the measurement range or increase the peak detection width.

Therefore, by storing combinations of the diagnostic parameter 108 and the validity determination result 109 that can be modified in such a manner in the determination database 110, it is possible to derive a method for correcting the diagnostic parameter 108 based on the validity determination result 109 and display the result on the display input device 107.

However, for the display of the validity determination result 109 or the input of the diagnostic parameter 108, not only the graphical user interface shown in FIG. 2 but also a program source code, a graph display function, and the like may be used.

Second Embodiment

The configuration of an abnormality diagnosis system of a second embodiment will be described with reference to FIG. 4.

Normally, when adjusting the diagnostic model 105, the adjustment is made by changing the diagnostic parameter 108 as in the first embodiment. In the second embodiment, the adjustment range of the diagnostic parameter 108 is given in advance as a diagnostic parameter search width 111, diagnosis is performed within the range, and the validity determination result 109 is displayed on the display input device 107. Therefore, it is possible to quickly adjust the diagnostic parameter 108.

However, it is not always necessary to input the diagnostic parameter search width 111 for all the diagnostic parameters 108, and the diagnostic parameter 108 may be used together. In addition, in the second embodiment, there is no determination database 110 shown in FIG. 1. Since other configurations are the same as those of the abnormality diagnosis system of the first embodiment shown in FIG. 1, description thereof will be omitted.

FIG. 5 shows an example of a user interface when the diagnostic parameter 108 and the diagnostic parameter search width 111 are used together. The same preprocessing, feature amount, and diagnosis as in FIG. 2 are selected, and the diagnostic parameter search width 111 is used for the parameter X among the parameters, and the diagnostic parameter 108 is designated for the other parameters.

At this time, when diagnosis is performed, data analysis is performed a plurality of times according to the diagnostic parameter search width 111, and the determination factors in each data analysis are collectively displayed in the middle part. In this manner, by collectively displaying the determination factors corresponding to the diagnostic parameter search width 111, it is possible to select parameters with as many determination factors as possible for which it is determined that the data analysis has been performed appropriately. Therefore, it is possible to quickly adjust the diagnostic parameter 108.

In addition, the adjustment using the diagnostic parameter search width 111 may be performed in order for each parameter in this manner, or the adjustment may be performed by setting the diagnostic parameter search width 111 simultaneously for a large number of parameters.

Third Embodiment

The configuration of an abnormality diagnosis system of a third embodiment will be described with reference to FIG. 6.

In the third embodiment, diagnostic parameters can be adjusted more easily by reducing the diagnostic parameter 108 input from the display input device 107 using a diagnostic package 112, which is obtained by combining preprocessing or feature amount extraction and diagnosis, for the data analysis unit 102. Since other configurations are the same as those of the abnormality diagnosis system of the first embodiment shown in FIG. 1, description thereof will be omitted.

At this time, the diagnostic package 112 is not limited to one, and a plurality of diagnostic packages 112 may be prepared to detect several failures. An example of the user interface in this case is shown in FIG. 7.

In FIG. 7, three diagnostic packages are prepared, two (deterioration A and deterioration B) of which are selected, and parameters for each diagnostic package are input. At this time, when diagnosis is performed, a diagnosis result for each diagnostic package 112 is displayed, and the validity determination result 109 is also displayed for each diagnostic package 112.

In this manner, the diagnostic parameter 108 can be easily adjusted without selecting a combination of preprocessing or feature amount extraction and diagnosis.

Fourth Embodiment

The configuration of an abnormality diagnosis system of a fourth embodiment will be described with reference to FIG. 8.

In the fourth embodiment, as shown in FIG. 8, the system provider of the abnormality detection system adjusts the diagnostic parameter 108 for a diagnosis target device 100 owned by the facility operator. The status of the diagnosis target device 100 is monitored by the status monitoring unit 101, the data analysis unit 102 detects the tendency of abnormality or deterioration based on the monitoring data, and the result is transmitted to the display input device 107.

At this time, devices other than the diagnosis target device 100 and the status monitoring unit 101 may be shared units that can be accessed by the facility operator and the system provider. The validity determination result 109 is transmitted from the data analysis unit 102 to the system provider, and the system provider adjusts the diagnostic parameter 108 based on the determination database 110 held by itself.

Therefore, the system provider can adjust the diagnostic parameter 108 appropriately even remotely. In addition, it is also possible for the facility operator to adjust the diagnostic parameter 108 using a shared unit and request the system provider to make an adjustment only when the adjustment is difficult. As a result, it is possible to calculate the usage fee according to the amount of work of the system provider by charging for the amount of adjustment based on the number or amount of requests for adjustment to the system provider.

Fifth Embodiment

The configuration of an abnormality diagnosis system of a fifth embodiment will be described with reference to FIG. 9.

In the fifth embodiment, as shown in FIG. 9, a diagnostic device 120 in which the status monitoring unit 101 and the data analysis unit 102 are integrated is used. The diagnostic device 120 connected to the diagnosis target device 100 has the status monitoring unit 101 and the data analysis unit 102 and performs data analysis according to the diagnostic parameter 108 transmitted from a Web GUI 121, and the data analysis result is transmitted to the Web GUI 121 for display and input.

The Web GUI 121 may be built in the diagnostic device 120 or configured on a network. At this time, the validity determination result 109 is transmitted from the diagnostic device 120 to a storage 122. By comparing the validity determination result 109 with the determination database 110 stored on the storage 122, a method for correcting the diagnostic parameter 108 is displayed on the Web GUI 121.

In this manner, the analyst can correct the diagnostic parameter 108 appropriately and easily by using the Web GUI 121.

According to the embodiment described above, even a person who does not have expertise in data analysis can easily determine the validity of the data analysis process.

Here, the data analysis unit 102 shown in FIG. 1 is configured by, for example, a computer having a storage device, a CPU, and the like. In addition, the "functions" of the "~unit" shown in FIG. 1 are realized by executing a program by a processor (CPU or the like), for example.

REFERENCE SIGNS LIST

100 Diagnosis target device
101 Status monitoring unit
102 Data analysis unit
103 Preprocessing unit
104 Feature amount extraction unit
105 Diagnostic model
106 Diagnostic unit
107 Display input device
108 Diagnostic parameter
109 Validity determination result
110 Determination database
111 Diagnostic parameter search width
112 Diagnostic package
113 Validity determination unit
120 Diagnostic device
121 Web GUI for display and input
122 Storage

The invention claimed is:

1. An abnormality diagnosis system for diagnosing an abnormality in industrial equipment, comprising:
a data analysis unit that analyzes data based on status monitoring information of the industrial equipment; and
a display device that displays an analysis result of the data,
wherein the data analysis unit includes a validity determination unit that calculates a determination factor for determining validity of an analysis process of the data to determine the validity of the data analysis process,
wherein the display device displays a determination result of the validity,
wherein the data analysis unit further includes:
a preprocessing unit that preprocesses data necessary for the analysis of the status monitoring information; and
a feature amount extraction unit that extracts a feature amount as a feature of the analysis from the preprocessed data,
wherein the validity determination unit calculates the determination factor for determining the validity based on input information from the preprocessing unit and the feature amount extraction unit, wherein the display device is configured by a display input device to which predetermined information can be input,
wherein the data analysis unit further includes a diagnostic unit that diagnoses an abnormality in the industrial equipment by using the feature amount,
wherein the diagnostic unit diagnoses an abnormality in the industrial equipment by using a diagnostic parameter and a diagnostic model input from the display input device,
wherein the abnormality diagnosis system further comprises:
a determination database that stores a method for correcting the diagnostic parameter corresponding to the validity determination result,
wherein a method for correcting the diagnostic parameter corresponding to the validity determination result is read out from the determination database and displayed on the display device,
wherein the display device displays, as the validity determination result, whether or not the data analysis is valid or not for each determination item,
wherein when the data analysis is not valid, the diagnostic parameter correction method corresponding to the validity determination result is read out from the determination database, and
wherein the diagnostic parameter correction method is displayed so as to correspond to the determination item for which the data analysis is not valid.

2. The abnormality diagnosis system according to claim 1,
wherein the validity determination unit sets the determination factor so that the status monitoring information falls within a predetermined measurement range.

3. The abnormality diagnosis system according to claim 1,
wherein the validity determination unit sets the determination factor so that a peak value or a peak position in the feature amount falls within a predetermined range.

4. The abnormality diagnosis system according to claim 1,
wherein the data analysis unit is configured by a plurality of diagnostic packages, and determines the validity of the data analysis process for each of the diagnostic packages, and
the display device displays the validity determination result for each of the diagnostic packages.

5. The abnormality diagnosis system according to claim 1,
wherein the determination factor is transmitted from an owner of the industrial equipment to a system provider of the abnormality diagnosis system, and
a usage fee charged by the system provider for the abnormality diagnosis system is changed according to the number or amount of adjustments of diagnostic parameters used by the system provider to analyze the data.

6. The abnormality diagnosis system according to claim 1,
wherein a diagnostic device including the data analysis unit and a status monitoring unit for monitoring a status of the industrial equipment, a storage having a determination database that stores a method for correcting a diagnostic parameter used to analyze the data so as to correspond to the validity determination result, and the display device for displaying the data analysis result are connected to each other through a network, and
the display device displays the determination result of the validity of the data analysis process and a method for correcting the diagnostic parameter corresponding to the validity determination result that is read out from the determination database.

7. An abnormality diagnosis system for diagnosing an abnormality in industrial equipment, comprising:

a data analysis unit that analyzes data based on status monitoring information of the industrial equipment; and a display device that displays an analysis result of the data, wherein the data analysis unit includes a validity determination unit that calculates a determination factor for determining validity of an analysis process of the data to determine the validity of the data analysis process, wherein the display device displays a determination result of the validity, wherein the data analysis unit further includes:

a preprocessing unit that preprocesses data necessary for the analysis of the status monitoring information; and a feature amount extraction unit that extracts a feature amount as a feature of the analysis from the preprocessed data, wherein the validity determination unit calculates the determination factor for determining the validity based on input information from the preprocessing unit and the feature amount extraction unit, wherein the display device is configured by a display input device to which predetermined information can be input, wherein the data analysis unit further includes a diagnostic unit that diagnoses an abnormality in the industrial equipment by using the feature amount, wherein the diagnostic unit diagnoses an abnormality in the industrial equipment by using a diagnostic parameter and a diagnostic model input from the display input device, wherein, when the diagnostic model is adjusted by changing the diagnostic parameter, the diagnostic unit receives an adjustment range of the diagnostic parameter from the display input device in advance as a diagnostic parameter search width and diagnoses an abnormality in the industrial equipment, wherein the data analysis unit analyzes the data a plurality of times according to the diagnostic parameter search width, and wherein the display input device displays the validity determination result so as to correspond to the diagnostic parameter search width.

8. An abnormality diagnosis method for diagnosing an abnormality in industrial equipment, comprising:

analyzing data based on status monitoring information of the industrial equipment;

calculating a determination factor for determining validity of an analysis process of the data to determine the validity of the data analysis process; and displaying an analysis result of the data and a determination result of the validity on a display device that is configured by a display input device to which predetermined information can be input;

preprocessing data necessary for the analysis of the status monitoring information;

extracting a feature amount as a feature of the analysis from the preprocessed data;

calculating the determination factor for determining the validity based on input information from the preprocessing of the data and the extracting of the feature amount;

diagnosing an abnormality in the industrial equipment by using the feature amount;

diagnosing an abnormality in the industrial equipment by using a diagnostic parameter and a diagnostic model input from the display input device; and storing, in a determination database, a method for correcting the diagnostic parameter corresponding to the validity determination result, wherein the method for correcting the diagnostic parameter corresponding to the validity determination result is read out from the determination database and displayed on the display device, wherein the display device displays, as the validity determination result, whether or not the data analysis is valid or not for each determination item, wherein when the data analysis is not valid, the diagnostic parameter correction method corresponding to the validity determination result is read out from the determination database, and wherein the diagnostic parameter correction method is displayed so as to correspond to the determination item for which the data analysis is not valid.

* * * * *